(12) United States Patent
Sivakumar

(10) Patent No.: US 7,116,700 B1
(45) Date of Patent: Oct. 3, 2006

(54) FREQUENCY HOPPING SPREAD SPECTRUM COMMUNICATION SYSTEM

(75) Inventor: Tatikonda Sivakumar, Adachi-ku (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/168,377

(22) PCT Filed: Dec. 22, 1999

(86) PCT No.: PCT/IB99/02085

§ 371 (c)(1),
(2), (4) Date: Aug. 28, 2002

(87) PCT Pub. No.: WO01/47308

PCT Pub. Date: Jun. 28, 2001

(51) Int. Cl.
*H04B 1/69* (2006.01)
(52) U.S. Cl. .................................. 375/132
(58) Field of Classification Search ............. 375/132, 375/130, 134, 137, 138, 133; 455/450, 452, 455/464; 370/329, 341
See application file for complete search history.

(56) References Cited

U.S. PATENT DOCUMENTS

| | | | | |
|---|---|---|---|---|
| 4,716,573 A | * | 12/1987 | Bergstrom et al. | 375/132 |
| 6,249,540 B1 | * | 6/2001 | Dicker et al. | 375/133 |
| 6,272,353 B1 | * | 8/2001 | Dicker et al. | 455/517 |
| 6,480,721 B1 | * | 11/2002 | Sydon et al. | 455/464 |
| 6,704,346 B1 | * | 3/2004 | Mansfield | 375/136 |
| 2005/0018631 A1 | * | 1/2005 | Sivakumar et al. | 370/329 |

FOREIGN PATENT DOCUMENTS

| | | |
|---|---|---|
| EP | 0182762 | 5/1986 |
| WO | 9909671 | 2/1999 |

* cited by examiner

*Primary Examiner*—Khai Tran
(74) *Attorney, Agent, or Firm*—Foley & Lardner LLP

(57) ABSTRACT

A method of operating a spread spectrum radio communication system comprising a central node and a dependent node which communicate over a frequency hopping channel. The dependent node compiles interference information for the channel and, at intervals, transmits the interference information to the central node. The central node, based on the interference information received from the dependent node, creates a black list of worse-performing frequency bands in the channel.

19 Claims, 4 Drawing Sheets

FREQUENCY HOPPING SPREAD SPECTRUM COMMUNICATION SYSTEM

CROSS-REFERENCE TO RELATED APPLICATIONS

This application is a National Phase application based on International Application No. PCT/IB99/02085, filed on Dec. 22, 1999.

FIELD OF THE INVENTION

The present invention relates to a frequency hopping spread spectrum communication system.

BACKGROUND OF THE INVENTION

In most countries, the part of the spectrum commonly known as the Industry Scientific Medicine or ISM band (in the region of 2.4 GHz) is largely unregulated, meaning that no license is needed to make electromagnetic transmissions in this band.

In this unruly part of the spectrum, frequency hopping spread spectrum systems have been found to have good performance. In these systems, the carrier frequency of a modulated information signal changes or hops periodically to another (or possibly the same) frequency of a set of possible frequencies called the hop set. The hopping sequence is governed by the spreading code. FIG. 9 shows the time/frequency occupancy of an exemplary communication between two nodes of a frequency hopping spread spectrum system. Thus, because the frequency hopping spread spectrum system is continually hopping between parts of the spectrum, the effect of narrow band interference in a particular region is limited.

The present invention is concerned with the operation of a frequency hopping spread spectrum communication system in the presence of a "persistent interferer" such as, for example, a microwave oven or a WLAN network operating at a fixed region of the spectrum.

Persistent interferers present two distinct problems to this kind of system.

(i) "System Performance"

Although the use of a frequency hopping spread spectrum system per se limits the degradation in system performance caused by a persistent interferer, the effect on system performance can be significant, especially in the presence of several persistent interferers.

(ii) "System Compatibility"

WLANs often transmit data in large packets. The presence of a nearby frequency hopping spread spectrum regularly hopping into the region of the spectrum used by the WLAN during the transmission of a large packet can have a devastating effect on the WLAN's performance.

SUMMARY OF THE INVENTION

With this in mind, according one aspect, the present invention may provide a method of operating a spread spectrum radio communication system comprising a central node and a dependent node which communicate over a frequency hopping channel, comprising the steps of:

the dependent node compiling interference information for the channel and, at intervals, transmitting the interference information to the central node;

the central node, based on the interference information received from the dependent node, creating a black list of worse-performing frequency bands in the channel.

Thus, the system of the present invention is able to keep track of those frequency bands in the hopping sequence which have previously been most susceptible to interference.

By doing so, the system of the present invention can take steps to avoid those frequency bands which have in the past been most susceptible to interference and so, in the immediate future, are most likely to be noisy. As a result, the system's own performance ((i) above) is enhanced, because it does not have to waste its efforts trying to communicate in a frequency band where its transmission is likely to be disrupted. Also, from the viewpoint of neighbouring systems ((ii) above), the system of the present invention is sociable in its use of spectrum, because having identified when a particular frequency band is persistently noisy, and therefore perhaps is being used, it can avoid that frequency band for the near future and thereby not kill the data traffic of a neighbouring communication system—if there is one.

In one embodiment, the central node transmits information indicative of the black-listed frequency bands to the dependent nodes, so that each dependent node locally knows which frequency bands may not be used. Preferably, after receipt of said information, each dependent node follows a modified hop sequence with the black-listed frequency bands removed from the hop set. Alternatively, the nodes can always follow the original hop sequence but refrain from transmitting in a time/frequency slot which occupies one of the black-listed frequency bands.

The system typically comprises a plurality of dependent nodes, and preferably, the selection of the black-listed frequency bands includes the step of calculating a system-wide measure of the interference experienced in the frequency bands of the channel over a recent interval. Preferably, the selection also includes the calculation a system-wide measure of the historic interference experienced in the frequency bands of the channel.

The number of frequency bands to be placed on the black list may be fixed independent of the absolute value of said system-wide measures. The number of frequency bands to be placed on the black list may also be fixed providing the absolute value of the said system-wide measures indicates that the performance fall below a predetermined threshold. If said system-wide measures indicate that the performance of the worst-performing channel exceeds the predetermined threshold, they need not be included on the black list. The number of frequency bands to be placed on the black list may also be determined by the absolute value of the said system-wide measures indicates that the performance fall below a predetermined threshold. This means that in a very noisy environment quite a number of frequency bands could potentially be black listed.

The creation of the black list can take place with varying degree of frequency depending on the environment in which the system is to operate. For example, at one extreme, after initialization the creation of the black list might take place only once or perhaps once every hour. This might be sufficient where the likely interferer was a microwave oven. On the other hand, in a noisy environment with many interferers for best spectrum utilization, regular, e.g. every second, recompilation of the black list may be more appropriate.

According to a further aspect, the present invention provides a dependent node of a frequency hopping spread spectrum system, comprising means for compiling interference information indicative of the interference experienced in the frequency bands of a frequency hopping channel over an interval, and means for transmitting the interference information.

According to a further aspect, the present invention provides a central node of a frequency hopping spread spectrum system, comprising means for receiving interference information from at least one dependent node, and means for creating a black list of worse-performing frequency bands in the channel based on said received interference information.

Preferably, the central node also comprises means for transmitting information indicative of the black-listed frequency bands to the dependent nodes at intervals.

BRIEF DESCRIPTION OF THE DRAWINGS

Exemplary embodiments of the invention are hereinafter described with reference to the accompanying drawings, in which.

DETAILED DESCRIPTION OF THE PREFERRED EMBODIMENTS

Figure 2:
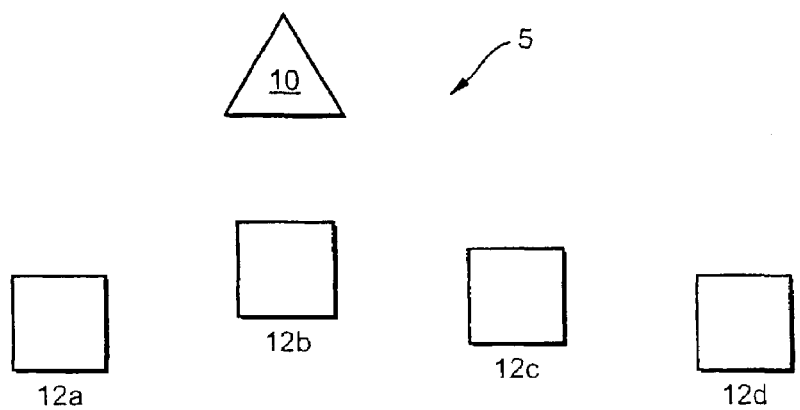
FIG. 2 shows a frequency hopping spread spectrum communication system having 5 nodes.

FIG. 2 shows a frequency hopping spread spectrum system/network, generally designated 5, operating in the ISM band. The system 5 comprises five nodes: a node 10 serves as the master node and the other four nodes serve as slave nodes 12a, 12b, 12c and 12d. These devices are lower power RF devices, preferably operating in accordance with the Bluetooth protocol. Within the system 5, communication takes place, bidirectionally, between the master node 10 and any of the slave nodes 12a, 12b, 12c and 12d. No communication takes place directly between the slave nodes themselves.

Each node 10,12 is identical having the same hardware and the same software enabling it to be operable to act as a master node or a slave for a given network, or possibly acting as the master node for a first network while simultaneously acting as a slave node for a second network.

Figure 3:
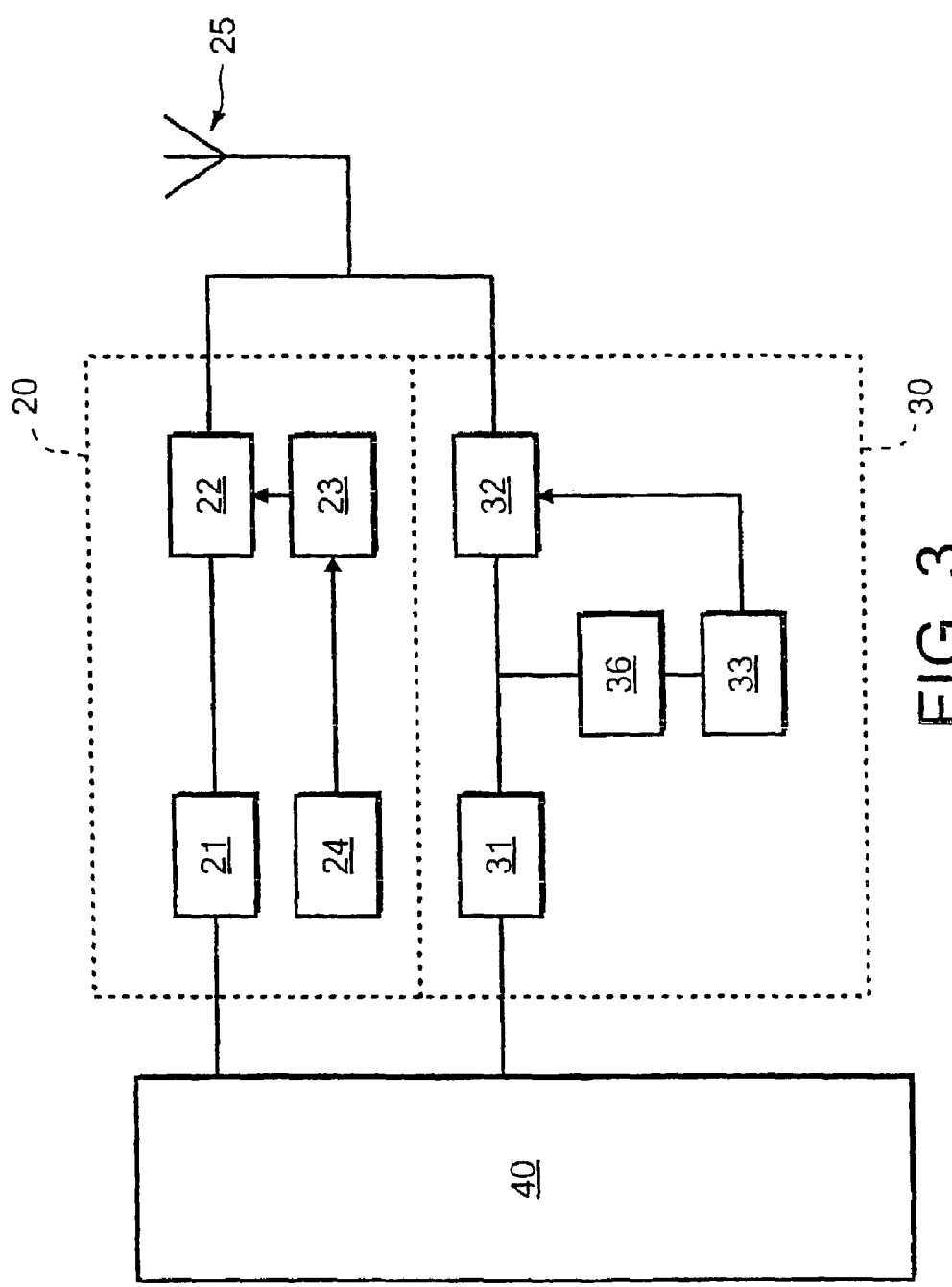
FIG. 3 shows a hardware block diagram for a node of FIG. 2.

In more detail, referring to FIG. 3, each node 10,12 comprises a transmitter 20, a receiver 30 and a control processor 40. The transmitter 20 comprises a baseband modulator 21 to which baseband data for transmission is supplied by the control processor 40. The baseband modulator produces a modulated data signal and feeds it to an upconverter 22. The upconverter 22 shifts the modulated data signal to a frequency dictated by a frequency synthesiser 23 for transmission by an antenna 25. The output frequency of the frequency synthesiser 23 is controlled by a spreading code output by a code generator 24. The receiver 30 comprises a complementary architecture. A downconverter 32 shifts the signal received via an antenna 35 to a lower frequency, governed by the output frequency of a frequency synthesiser 33, and feed this frequency-shifted signal to a demodulator 31 for demodulation to baseband data. The output frequency of the frequency snythesiser is controlled by a locally generated spreading code output from a code generator 34. Synchronization and tracking circuitry 36 ensure that the locally generated carrier synchronises sufficiently well to the received carrier so that correct despreading of the received signal is possible.

Figure 4:
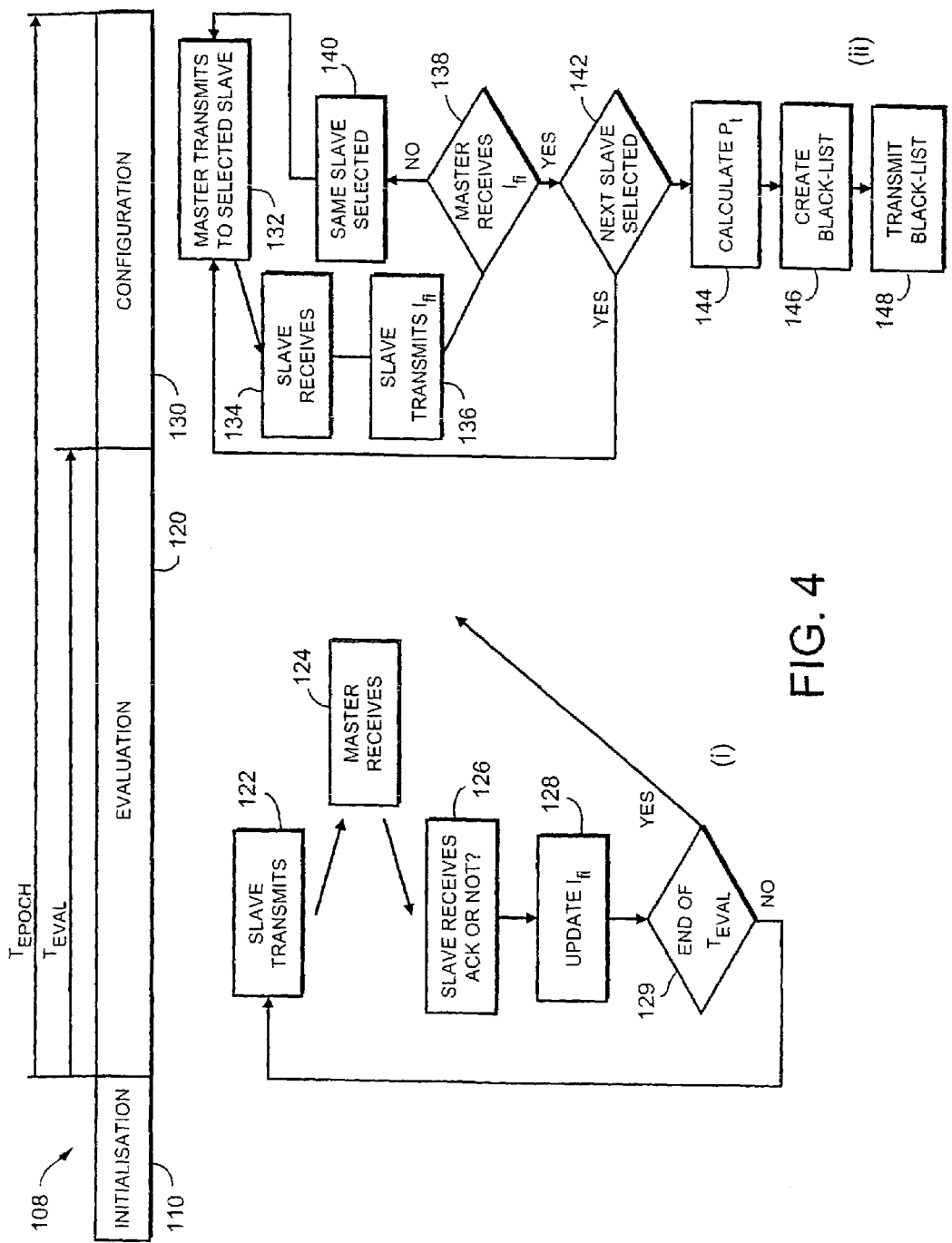
FIG. 4 show a diagram illustrating the operation of the system.

FIG. 4 show a diagram illustrating the operation of the system. A time line 108 shows the system in various phases of operation: initialisation 110, evaluation 120, and configuration 130. The time in which the evaluation phase takes place is referred to as the evaluation interval, $T_{evall}$ and the time in which the evaluation phase and the configuration phase take place is referred to as an epoch, $T_{epach}$.

Figure 1:
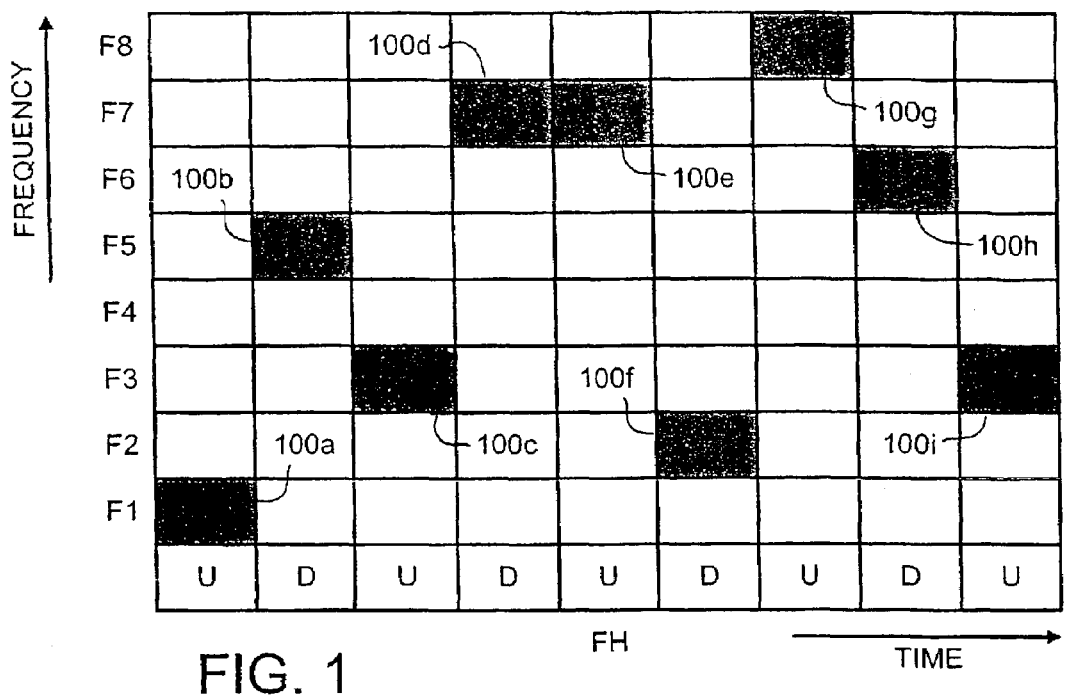
FIG. 1 shows the time/frequency occupancy of a frequency hopping spread spectrum communication system.

On initialisation, each node 10,12 is synchronised to follow a hop sequence F within the frequency range comprising frequency bands F1 to F8, the portion of the hop sequence shown in FIG. 1 being F1, F5, F3, F7, F7, F2, F8, F6, F3 and the corresponding time/frequency slot being labelled 100a–i. Each time slot in the hop sequence is alternately reserved for transmission by the central node 10 (D slots) and transmission by the dependent nodes (U slots). System parameters, for example, $T_{eval}$, and $T_{epach}$ are also set in this initialisation phase.

After initialisation, for the evaluation interval, $T_{evall}$ communication between each slave node 12 and the master node 10 takes place as illustrated by flowchart (i) of FIG. 4, If a slave node, say node 12a, wants to transmit a packet to the master node 10, it waits until the next available U time/frequency slot, for example, time/frequency slot 100a (shown in FIG. 1), and makes its transmission during this time/frequency slot 100a, step 122, and waits for an acknowledgement from the master node 10, step 124, on the next D slot, namely time/frequency slot 100b (shown in FIG. 1).

If an acknowledgement (ACK) is not received in time/frequency slot 100b, then the slave node 12a assumes that the packet transmitted in time/frequency slot 100a was not properly received by the master node 12 (step 126). The failure of the master node to receive the incoming packet could have been because of collision with an attempted packet transmission by another slave node 12b–d in the same system, collision with a neighbouring similar system having a different master node, or interference from the previously-mentioned persistent interferers such a microwave or a WLAN network.

The slave node 12a maintains a record for the evaluation interval, $T_{evall}$ of how many times it has tried to make a transmission on each frequency band F1–8, $T_i$, and how many of those times the transmission was successful, NS; and, from this information, calculates, at step 128, a local interference indices 1F (where in this exemplary system i=1 to 8 because there are eight frequency bands in the channel). In this case, the slave node 12a calculates a new value for $1_{F1}$, because the packet transmission was attempted on U time slot 100a, which occupies frequency band F1, according to the relationship $$1_{F1} = (T_1 - NS_1)/T_1 \tag{1}$$

This process is repeated every time the slave node 12a fails to successfully transmit a packet or to transmit a packet for the first time. Each slave node 12 independently carries out the same process.

In this way, each slave node 12 builds up a picture over the evaluation interval, $T_{eval}$, of its own local view of how prone to interference each frequency band, F1 to F8, in the channel is. This picture is encapsulated in the interference indices $1_{Fi}$ stored at each slave node 12.

At the end of the interval, the system moves into the configuration phase 130 as illustrated by flowchart (ii) in FIG. 4. The master node 10 broadcasts on a D time/frequency slot a command addressed to a selected node to transmit its local interference indices $1_{Fi}$ to the master node on the next U slot (step 132). At step 134, the addressed slave 12 receives the request and, at step 136, transmits the interference indices $1_{Fi}$. At steps 138, 140 and 132, if the master node 10 does not properly receive the interference indices $1_{Fi}$, it remakes its request on the next D time/frequency slot. The master node 10 repeats this interrogation process until it has successfully received the local interference indices for each dependent node (step 142).

With the interference indices $1_{Fi}$ from each slave node 12, the master node 10 calculates the system-aggregate performance of each frequency band Fi in the channel, in particular the system-aggregate probability of error free transmission over the previous interval $P_t$ (step 144), $$P_t(Fi) = \Sigma(1_{Fi}/n) \quad (2)$$

where n= the number of slave nodes.

Based on this, at step 146, the master node 10 identifies the worst-performing frequency bands by comparing their respective Pt over the last evaluation interval 120 and creates a black list of the two worst-performing frequencies. At step 148, the master node broadcasts repeatedly on the remaining D slots in the configuration interval 130 a control packet indicating the black-listed frequencies. The control packet is transmitted repeatedly to ensure reception by all slave nodes 12.

At the end of the current epoch, i.e. after the configuration phase, the system again enters the evaluation phase 120. Now, armed with the knowledge of which frequencies are worst-performing the master and slave nodes 10, 12 again follow the hop sequence F, but every node omits the two black-listed frequency bands because they are known to be poorly performing.

The system operation proceeds as before, except during the second and subsequent configuration phases 130, the parameters $P_t(Fi)$ are adjusted according to the parameter a (where $0 \leq \alpha \leq 1$) is and the value of the $P_1$ calculated during the previous configuration phase, $P_{t-1}$.

$$P_t(Fi) = \alpha P_t(Fi) + (1-\alpha) \cdot P_{t-1}(Fi) \quad (3)$$

This modification of $P_t(Fi)$ has the effect, to an extent governed by the value of $\alpha$ of making $P_t$ reflect not only the frequency bands performance over the evaluation interval but also the historic performance over previous evaluation intervals.

Figure 5:
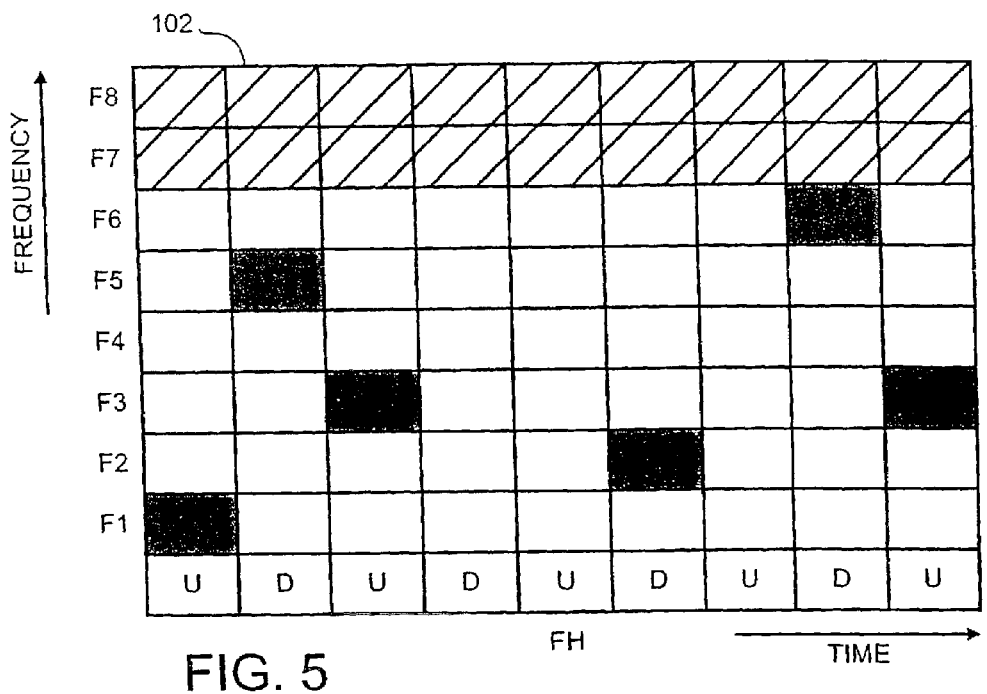
FIG. 5 shows the time/frequency occupancy of the channel of the FIG. 2 system in the presence of a persistent interferer.
Figure 6:
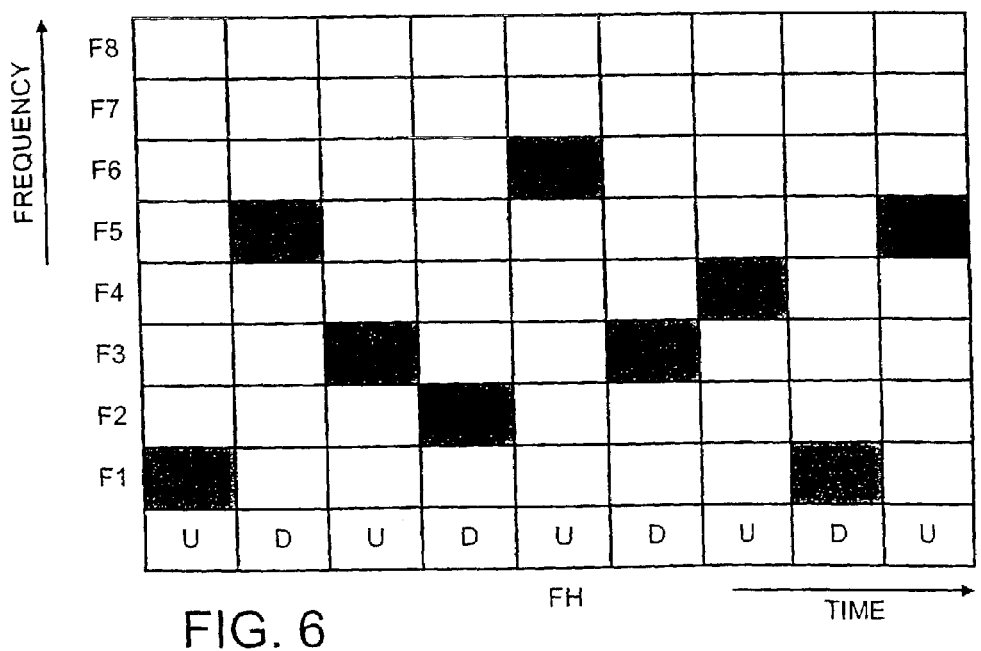
FIG. 6 shows time/frequency occupancy of the channel of FIG. 2 system where 2 black-listed frequency band are removed from the hop set.

If the situation is now considered where the system 5 is being used in the vicinity of a WLAN. This network sporadically transmits relatively long packets of information in an area of the spectrum which falls within the frequency bands used by the system 5. An example of the interference of this neighbouring MAN is shown in FIG. 5 and denoted 102. It will be appreciated that for the portion of the hopping sequence F shown in FIG. 5, the F7 and F8 frequency bands are completely swamped by the long packet transmission of the WLAN. By comparison with FIG. 1, we can see that frequency/time slots 100d, 100e and 100g have been rendered useless. Although only a small portion of the hopping sequence is visible in FIG. 5 if we assume that transmissions of the MAN have disrupted F7 and F8 for much of an evaluation interval, then it will be appreciated that any slave node 12 which tries to make use of F7, F8 is not likely to meet with much success. As a result, the slave nodes all calculate during the evaluation phase 120 local interference indices for IF, and IF., according to equation (1) above, which are considerably smaller than for the indices of the other frequency bands F 1–6. Accordingly, during the configuration phase 130, the master node 10 collects the local interference indices from each slave node 12 and calculates a system-aggregate probability of error-free transmission Pt for each frequency F1 to F8 according to equation (2) and adjusts it according to historic information as per equation (3), the master node identifies frequency bands F7 and F8 as the worst performing, i.e. most interfered with, frequency bands and so places them on a black list (step 146) which it repeatedly transmits to all the slave nodes 12 (step 148). At the start of the next evaluation phase 120, with this knowledge of which frequency bands have been black listed, each node follows a modified hopping sequence F' which omits the black-listed frequencies from the hop set, as shown in FIG. 6, from the sequence. The portion of the hop sequence shown is F1, F5, F3, F2, F6, F3, F4, F1, F5. In this way, the system 5 aims to avoid in advance the RF hot spots in the local environment. This not only improves its own system performance, but also makes the system 5 far more sociable in RF terms to neighbouring systems e.g. a WLAN.

Once a frequency band has been black-listed it is no longer in use by the system and hence no fresh interference index is being calculated by the slave nodes. Therefore, the master node 10, when at step 146 it is deciding upon the black-listed channels for the next epoch, uses the value of the interference indices, which the currently black-listed channels had immediately before they were black listed scaled by $\beta^X$ where $\beta<1$ and x is the number of epochs that the frequency band has been on the black list, as the basis of comparison with the newly-gathered interference indices from the unblack-listed frequency bands.

It will be appreciated that the selection of the system parameters $\alpha$ and $\beta$ have a great influence on under what circumstances and for how long a given frequency band is black listed. For example, the greater the value of a, the greater the weighting given to the environment in only the previous evaluation phase 120. Whereas, if a has a small value, then greater weighting is given to the conditions in the environment in the past. Regarding $\beta$, if $\beta$ is small, then the black-listed channels have a greater chance of being quickly taken off the black list as compared with when R is close to 1.

It will be appreciated that for ease of description and for concision a simplified embodiment has been described. For example, the number of frequency bands in the channel was 8. But in a practical system there are likely to be many more frequency bands. According to the FCC regulations, a frequency hopping system in accordance with this invention operating in the ISM band must hop onto 75 out of the possible 79 frequency bands available. Although in the described embodiment, two frequencies bands are placed onto the black list. In practice, this number may be dictated or at least constrained by governmental regulations.

In the described embodiment of the invention, the master node 10 collates the interference indices $1_{F1}$, by interrogating the slave nodes 12 in turn. In another embodiment, the slave nodes could sent this information after a predetermined time. In this case of course, the timing for the slave nodes to dispatch this information to the master node needs to be such that all the slave nodes access to the same U slot, to prevent excessive collisions between the slave nodes.

In the described embodiment of the invention, the evaluation period for each frequency band, but in other embodiments, the evaluation period for each node can be different, even substantially different.

The invention claimed is:

1. A method of operating a spread spectrum radio communication system comprising a central node and a plurality of dependent nodes which communicate over a frequency hopping channel, comprising:
   the dependent nodes compiling interference information for the channel and, at intervals, transmitting the interference information to the central node;
   the central node, based on the interference information received from the dependent nodes, creating a black list of worse-performing frequency bands in the channel and transmitting information indicative of the blacklisted frequency bands to the dependent nodes.

2. A method as in claim 1, wherein, after receipt of said information, each dependent node follows a modified hop sequence with the black-listed frequency bands removed from the hop set.

3. A method as in claim 2, wherein the creation of the black list includes the calculation of a system-wide measure of the interference experienced in the frequency bands of the channel over a recent interval.

4. A method as in claim 3, wherein the creation of the black list includes the calculation of a system-wide measure of historic interference experienced in the frequency bands of the channel.

5. A method as in claim 1, wherein each of the plurality of dependent nodes compiles interference information by:
   transmitting packets of information to the central node at a plurality of frequency bands;
   determining whether acknowledgment is received from the central node that the respective packets of information were received by the central node; and
   maintaining a record of how often the respective dependent node received acknowledgments from the central node at each of the plurality of frequency bands.

6. A method as in claim 1, wherein the record comprises an interference index calculated according to the formula $I_{Fi}=(T_i-NS_i)/T_i$, wherein $I_{Fi}$ is the interference index for a frequency band i, $T_i$ is the number of packets that the respective dependent node attempted to transmit to the central node, and $NS_i$ is the number of occurrences where the respective dependent node did not receive an acknowledgment from the central node.

7. A node for a frequency hopping spread spectrum system, comprising means for compiling interference information indicative of the interference experienced in frequency bands of a frequency hopping channel over an interval, means for transmitting the interference information to another node; and means for receiving information indicative of the blacklisted frequency bands from the another node, wherein the compiling of interference information comprises:
   transmitting packets of information to the another node at a plurality of frequency bands;
   determining whether an acknowledgment is received from the another node that the respective packets of information were received by the another node; and
   maintaining a record of how often acknowledgments were received from the another node at each of the plurality of frequency bands.

8. A node of a frequency hopping spread spectrum system, comprising means for receiving interference information from a plurality of dependent nodes, means for creating a black list of worse-performing frequency bands in the channel based on said received interference information.

9. A node as in claim 8, further comprising means for transmitting information indicative of the black-listed frequency bands to the dependent nodes at intervals.

10. A node as in claim 8, wherein the interference information comprises a record of how often acknowledgments were received by each respective dependent node from the node at each of plurality of frequency bands in response to packets transmitted by the respective dependent node.

11. A node as in claim 10, wherein the record comprises, for each dependent node, an interference index calculated according to the formula $I_{Fi}=(T_i-NS_i)/T_i$, wherein $I_{Fi}$ is the interference index for a frequency band i, $T_i$ is the number of packets that the respective dependent node attempted to transmit to the node, and $NS_i$ is the number of occurrences where the respective dependent node did not receive an acknowledgment from the node.

12. A node as in claim 11, wherein the creation of the black list includes the calculation of a system-wide measure of historic interference experienced in the frequency bands of the channel.

13. A node as in claim 12, wherein the system-wide measure comprises a probability of error free transmission over a previous interval $P_t$ calculated according to $P_t(Fi)=\Sigma (I_{Fi}/n)$, wherein Fi is a particular frequency band i and n is the number of dependent nodes.

14. A method of operating a spread spectrum radio communication system comprising a central node and a dependent node which communicate over a frequency hopping channel, comprising:
   the dependent node transmitting packets of information to the central node at a plurality of frequency bands;
   the dependent node determining whether acknowledgment is received from the central node that the respective packets of information were received by the central node; and
   the dependent node maintaining a record of how often acknowledgments were received from the central node at each of the plurality of frequency bands; and
   the central node, based on the interference information received from the dependent node, creating a black list of worse-performing frequency bands in the channel and transmitting information indicative of the blacklisted frequency bands to the dependent node.

15. A method as in claim 14, wherein the record comprises an interference index calculated according to the formula $I_{Fi}=(T_i-NS_i)/T_i$, wherein $I_{Fi}$ is the interference index for a frequency band i, $T_i$ is the number of packets that the node attempted to transmit to the another node, and $NS_i$ is the number of occurrences where the node did not receive an acknowledgment from the another node.

16. The method of claim 15, wherein the system comprises a plurality of dependent nodes.

17. A method as in claim 16, wherein the creation of the black list includes the calculation of a system-wide measure of the interference experienced in the frequency bands of the channel over a recent interval.

18. The method of claim 17, wherein the system-wide measure comprises a probability of error free transmission over a previous interval $P_t$ calculated according to $P_t(Fi)=\Sigma (I_{Fi}/n)$, wherein Fi is a particular frequency band i and n is the number of dependent nodes.

19. A method as in claim 14, wherein, after receipt of said information, the dependent node follows a modified hop sequence with the black-listed frequency bands removed from the hop set.

* * * * *